(12) United States Patent
Abe et al.

(10) Patent No.: US 7,677,381 B2
(45) Date of Patent: *Mar. 16, 2010

(54) VALUE MEDIUM PROCESSING DEVICE

(75) Inventors: Hiroshi Abe, Saitama-ken (JP);
Yoshinobu Tanaka, Saitama-ken (JP)

(73) Assignee: Asahi Sieko Co., Ltd., Tokyo (JP)

( * ) Notice: Subject to any disclaimer, the term of this patent is extended or adjusted under 35 U.S.C. 154(b) by 177 days.

This patent is subject to a terminal disclaimer.

(21) Appl. No.: 11/853,248

(22) Filed: Sep. 11, 2007

(65) Prior Publication Data

US 2008/0060908 A1  Mar. 13, 2008

(30) Foreign Application Priority Data

Sep. 13, 2006 (JP) .............................. 2006-248668

(51) Int. Cl.
*G07F 7/02* (2006.01)
*G07F 7/10* (2006.01)

(52) U.S. Cl. ......................... 194/210; 194/344; 194/346

(58) Field of Classification Search ......... 194/206–213, 194/344–346, 302; 705/65–69; 713/172–174; 380/229; 726/9
See application file for complete search history.

(56) References Cited

U.S. PATENT DOCUMENTS 5,871,076 A * 2/1999 Anello et al. ............... 194/347

| | | | |
|---|---|---|---|
| 6,260,686 B1 * | 7/2001 | Rigo | 194/210 |
| 6,786,408 B2 * | 9/2004 | Yamagishi et al. | 235/451 |
| 7,100,823 B2 | 9/2006 | Miyaji | |
| 2004/0262382 A1 | 12/2004 | Miyaji | |
| 2009/0065326 A1 * | 3/2009 | Abe et al. | 194/216 |

FOREIGN PATENT DOCUMENTS

| DE | 195 12 878 | 11/1995 |
|---|---|---|
| DE | 198 22 428 | 11/1999 |
| EP | 0 965 957 A2 | 12/1999 |
| JP | 2005-025404 | 1/2005 |
| JP | 2006-189986 | 7/2006 |

* cited by examiner

*Primary Examiner*—Jeffrey A Shapiro
(74) *Attorney, Agent, or Firm*—McGlew and Tuttle, P.C.

(57) ABSTRACT

A small-sized value medium processing device discriminates the genuine/false status of coins, and reads or write processes an electric information recording medium. The value medium processing device allows a coin slotted into a slot to roll along a coin path for discriminating the coin genuine/false status wherein the coin in the coin path can be cancelled by a canceling device. Slots for a coin and for an electric value recording medium are at least partly common with each other. A detecting device for the electric value recording medium is provided in the electric value medium slot. A deactivating device deactivates the canceling device based on detection by the detecting device.

13 Claims, 11 Drawing Sheets

VALUE MEDIUM PROCESSING DEVICE

CROSS REFERENCE TO RELATED APPLICATIONS

This application claims the benefit of priority under 35 U.S.C. §119 of Japan Patent Application JP 2006-248668 filed Sep. 13, 2006, the entire contents of which are incorporated herein by reference.

FIELD OF THE INVENTION

The present invention relates to a value medium processing device capable of at least discriminating the genuine/false status of a coin, and reading or writing value information in an electric value information recording medium. The present invention relates to a value medium processing device in which a coin as a value medium and an electric value information recording medium are slotted into slots which are at least partly common with each other. Further, the present invention relates to a value medium processing device capable of using a coin, an IC coin and an IC card. The value medium processing device according to the present invention is usable in a coin-operated game machine or an automatic dispenser. The term "coin" used herein is a generic term for coins as currency, metals, discs and tokens of game machines and the like. The term value medium used herein relates to such coins as well as other currency, sheets and cards including electric information recording media such as IC coins and an IC cards.

BACKGROUND OF THE INVENTION

Japanese unexamined patent publication No. 2006-189986 (FIGS. 1-3, pp. 2-4) is an example of the conventional art, that includes a sorting mechanism in which a vertically long path having the same width with a slot is provided behind a common slot in the form of vertically-long slot into which both of an IC coin and a coin can be slotted, a path for the coin which is a relatively high gradient downward slant having a width that is able to receive only a coin in its center part of the width direction is provided in a bottom face of the vertically long path. A slit-like coin receiving opening is provided having such width that exclusively allows passage of coin in an end of the path for coin. A shoulder of a downward slant face having lower gradient is formed in both end sides of the path for coin. An IC coin receiving part is provided previous to and forward of the slit-like coin receiving opening.

Japanese unexamined patent publication No. 2005-25404 (FIGS. 2-4, pp. 2-4) is an example of a second conventional art in which there a coin sorting machine has a smart card charging facility. A coin slot is provided in an upper part of a substantially upright base plate, and a coin return slot is disposed below the coin slot, wherein an upward slant surface is formed in correspondence with an upper part of the base plate. A coin slot is disposed in the upward slant face, and a communication antenna is disposed in a lower part of the upward slant face in the vicinity of the coin slot. An antenna display is provided in the upward slat face.

With Japanese unexamined patent publication No. 2006-189986 (FIGS. 1-3, pp. 2-4) it is advantageous that a coin and an IC coin can be slotted into the same slot, and hence a customer will not make a mistake in slotting. Although a coin is caused to drop into the coin path by the shoulder which is a downward slant face having low gradient, since the coin has force of inertia due to rolling, it may roll on the shoulder rather than dropping to the path for coin, which may result in failure in sorting of coins. Further, a coin is identified after sorted during rolling in the path of IC coin. Therefore, it is necessary to dispose an IC coin reading or writing device downstream of the path in which the coin rolls, leading the problem that the size of the apparatus increases. More specifically, from the view point of securing compatibility with a coin sorting device which is currently used in a game machine or the like, it is desirable to keep the size of the conventional coin sorting device.

With Japanese unexamined patent publication No. 2005-25404 (FIGS. 2-4, pp. 2-4), since an antenna for the IC card is disposed around the coin slot, it is necessary to put the IC card closer to the antenna at every charging. In other words, in sequentially playing the same game, it is necessary to hold IC card over the antenna at every starts of game, and this is cumbersome to the customer. Further, with Japanese unexamined patent publication No. 2005-25404 (FIGS. 2-4, pp. 2-4), when an IC coin is used, it is necessary to provide an antenna for communication in the coin path, leading the problem of increased size of the apparatus and of increased costs.

SUMMARY OF THE INVENTION

It is a first object of the present invention to provide a small-sized value medium processing device at least capable of discriminating the genuine/false status of coin, and executing reading or writing process for an electric information recording medium.

It is a second object of the present invention to provide a value medium processing device capable of reading or writing process securely in a value medium processing device at least capable of discriminating the genuine/false status of coin, and executing reading or writing process for an electric information recording medium.

It is a third object of the present invention to provide a small-sized value medium processing device capable of discriminating the genuine/false status of coins, and reading or writing from/to IC coins and IC cards.

It is a fourth object of the present invention to provide a small-sized value medium processing device capable of discriminating the genuine/false status of coins, and reading or writing from/to IC coins and IC cards with low cost.

According to the present invention a coin selector is provided with a value medium processing device in which a coin slotted into a slot is rolled along a coin path for discriminating the genuine/false status of the coin, and the coin in the coin path may be cancelled by the canceling means, wherein a slot for the coin and slots for electric value recording medium are at least partly in common with each other. A detecting means for detecting electric value recording medium is provided in the electric value medium slot. A deactivating means is provided that deactivates the canceling means based on detection by the detecting means.

According to another aspect of the invention a value medium processing device is provided in which after a coin and an IC coin are slotted into a common slot, they are guided to a coin path or a IC coin path which is wider than the coin. A canceling means is provided for the coin, wherein the IC coin path is provided with an IC coin detecting means. A deactivating means is provided that deactivates the canceling means based on detection by the detecting means. The coin path is disposed under the downward common path continuing from the slot. A deflecting means is disposed in the common path. A coin discriminating means is disposed so as to face with the coin path. An IC coin retaining means is disposed downstream of the deflecting means in the IC coin path. When the retaining means is in a retaining position of the IC coin, operation of the canceling means is deactivated, and when the detecting means discriminates the coin, the slotted-in coin is guided to the coin path by the deflecting means.

The value medium processing device may provide the IC coin path such that it is a path that continues from the slot and inclines downward at a predetermined angle. The coin path may be a path that continues from the slot and inclines at a predetermined angle below the IC coin path. The path that continues from the slot and generally corresponds to coin diameter is a common path for coin and IC coin.

The value medium processing device may have the coin path and the IC coin path be defined by an upright base, a cancel cover which can be approached to or removed to/from the base, and guide rails inclining downward at predetermined angels. The guide rails may be provided integrally with the cancel cover.

The value medium slot-in blocking means for the slot may further be provided. The value medium slot-in blocking means may be in a position where it substantially closes the slot when the deflecting means is being guided in the IC coin path, while value medium slot-in blocking means is in a slot-in allowing position when the deflecting means is not being guided.

The value medium processing device may be provided in which the slot is rectangular and vertically long, and an IC card path is formed along a lateral wall of the IC coin path.

In this configuration, a coin rolls along the coin path and reaches the genuine discriminating means. A coin that is slotted into a slot which is at least partly common with a slot for coin and slot for electric value recording medium is subjected to discrimination by the genuine discriminating means while it rolls along the coin path. If the a coin jams in the coin path, the coin will be eliminated from the coin path and cancelled by a customer to operate the canceling means for opening a part of the coin path, and returned to the return slot. Since the electric value recording medium is at least partly common with the slot for coin, its position is maintained by the canceling means. When the electric value recording medium is inserted into the electric value recording medium slot, the electric value recording medium is detected by the detecting means, and the canceling means is locked by the deactivating means. When the electric value recording medium is inserted into the electric value recording medium slot, the canceling means is locked by the deactivating means, and will not be moved if the customer tries to operate the canceling means. Therefore, the electric value recording medium will not be moved when it is slotted into the slot, so that it is possible to securely execute reading or writing process. Further, since slots for coin and electric value medium are at least partly in common with each other, it is possible to miniaturize the value medium processing device.

With the deflecting means disposed in the downward common path for coin and IC coin continuing from the slot, and a slotted-in medium is discriminated by the discriminating means disposed between the slot and the deflecting means. When the IC coin is slotted into the slot, it is discriminated by the discriminating means, and the deflecting means is retracted from the common path, and the IC coin rolls along the downward IC coin path. When a coin is slotted into the slot, it is discriminated by the discriminating means and the deflecting means is positioned at a deflecting position. The coin is guided to the coin path which is disposed in parallel below the IC coin path by the deflecting means immediately after it is slotted in, and discriminated whether it is genuine/false by the discriminating means, and the deflecting means is positioned in deflecting position. After the coin is guided to the coin path which is disposed in parallel below the IC coin path by the deflecting means immediately after it is slotted in, the coin is discriminated by the genuine discriminating means while it rolls along the coin path. When a coin jams in the coin path or when a coin is requested to be returned, the coin will be eliminated from the coin path and cancelled by a customer operating the canceling means for opening a part of the coin path, and the coin is returned to the return slot. An IC coin rolls along the IC coin path and is retained in a predetermined position, and the reading or writing process is executed for the IC coin. When the IC coin is retained in the IC coin path, the canceling means will not be moved even when canceling process is made, so that it is held in a predetermined position. Therefore, the reading and writing process for the IC coin can be securely executed. Further, since a coin is deflected to the coin path by the deflecting means immediately after it is slotted into the slot, and the coin path is disposed in parallel below the IC coin path, an advantage arises in that the apparatus can be miniaturized.

With the feature of a common path through which coin and IC coin commonly passes, continuing from the slot a length of the coin path corresponding to the diameter of coin, a coin slotted into the slot, and moving along the common path is guided downward by the deflecting means and guided to the coin path. Since the common path has such length that corresponds to the diameter of a coin, a coin will be guided to the coin path immediately after it is slotted. This makes it possible to minimize the length of the sorting part between coin and IC coin, and advantageously miniaturize the apparatus.

The coin path and the IC coin path in the value medium processing device may be defined by the upright base, and by the cancel cover which can be approached to or removed from the base and provided with an inclined guide rail. With this construction the structure is simple, and the value medium processing device can be advantageously miniaturized.

With the value medium slot blocking means according to the invention, when the deflecting means is in guiding position to the coin path, it may be positioned in such a position that substantially closes the slot. In other words, when the value medium processing device is in IC coin processing mode, the value medium slotted-in blocking means substantially closes the slot. Therefore, it is impossible to slot a coin into the slot, so that the canceling means will not be operated, and reading and writing process can be securely executed for the IC coin.

The slots for coin and IC coin may be partly further in common with the IC card slot, and one face thereof may advantageously be a common vertically long face. In this configuration, an IC coin and an IC card will follow and come close to this face. Therefore, by disposing a communication instrument for reading/writing IC coins and IC cards in this face, the instrument may be shared. This sharing of communication instrument gives an advantage of reducing the cost.

The best mode of the present invention relates to a value medium processing device in which after a coin and IC coin are slotted into a common slot, they are guided to a coin path or a IC coin path which is wider than the coin path, and a canceling means for the coin and the IC coin is provided, wherein the slot is rectangular and vertically long, and an IC card path is formed along a lateral wall of the IC coin path. The coin path and the IC coin path are defined by an upright base, a cancel cover which can be approached to or removed from the base, and guide rails inclining downward at predetermined angels, and the guide rails are formed integrally with the cancel cover. The IC coin path is a path that continues from the slot and inclines downward at a predetermined angle, the coin path is a path that continues from the slot and inclines at a predetermined angle below the IC coin path, and the path that continues from the slot and generally corresponds to coin diameter is a common path for coin and IC coin. The IC coin path is provided with an IC coin detecting means. A deactivating means that deactivates the canceling means based on detection by the detecting means is provided. The coin path is disposed under the downward common path continuing from the slot. A deflecting means is disposed in the common path. A coin discriminating means is disposed so as to face with the coin path. Further an IC coin retaining means is disposed downstream of the deflecting means in the IC coin path. A cancel deactivating means that deactivates operation of the canceling means when the retaining means is in retaining position of IC coin. The value medium slotted-in blocking means for the slot is further provided, and the value medium slotted-in blocking means is in a position where it substantially closes the slot when the deflecting means is being guided in the IC coin path, while it is in a slotted-in allowing position when the deflecting means is not being guided. When the detecting means discriminates the coin, the slotted-in coin is guided to the coin path by the deflecting means.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
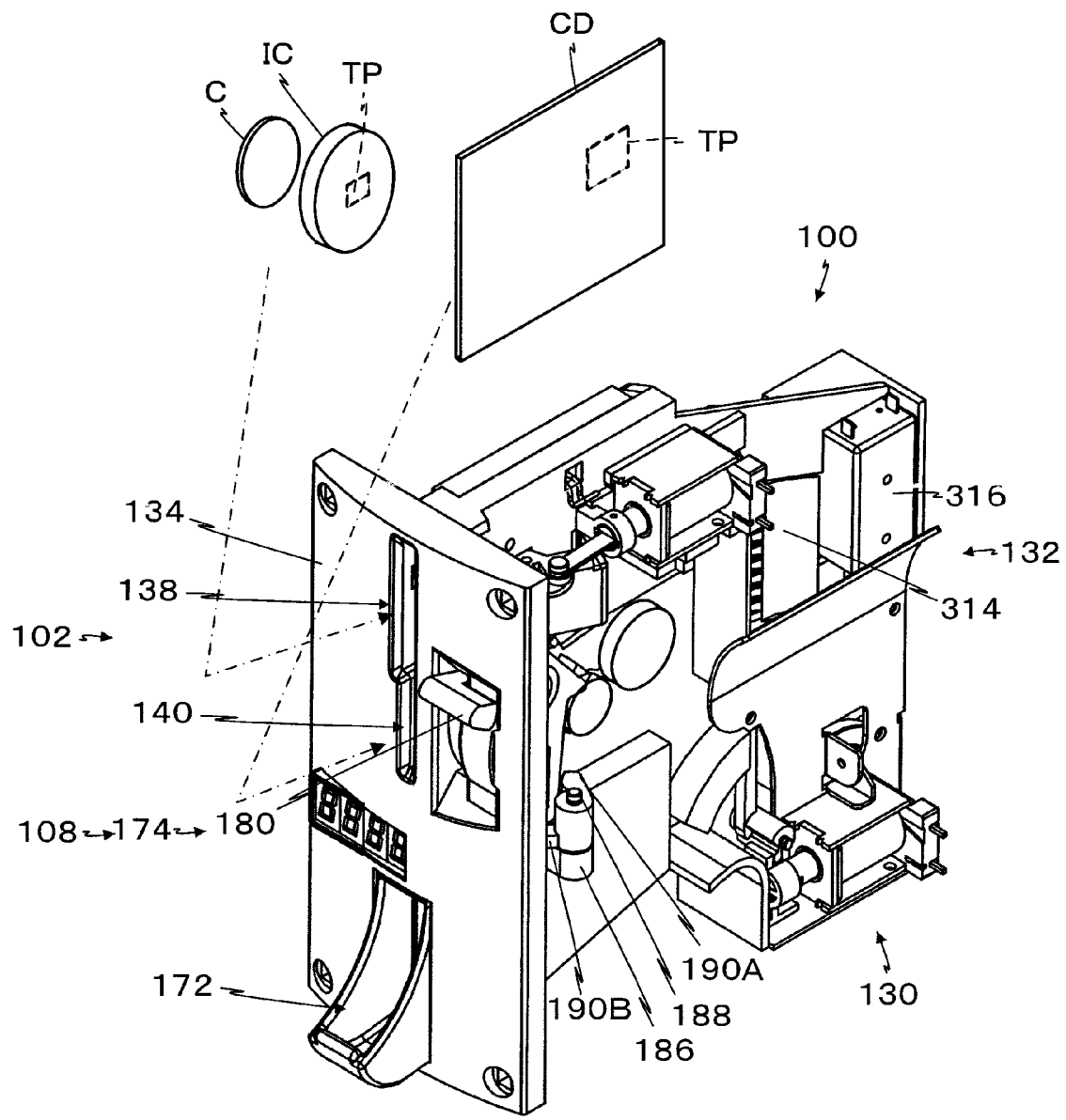
FIG. 1 is a perspective view of a value medium processing device.
Figure 2:
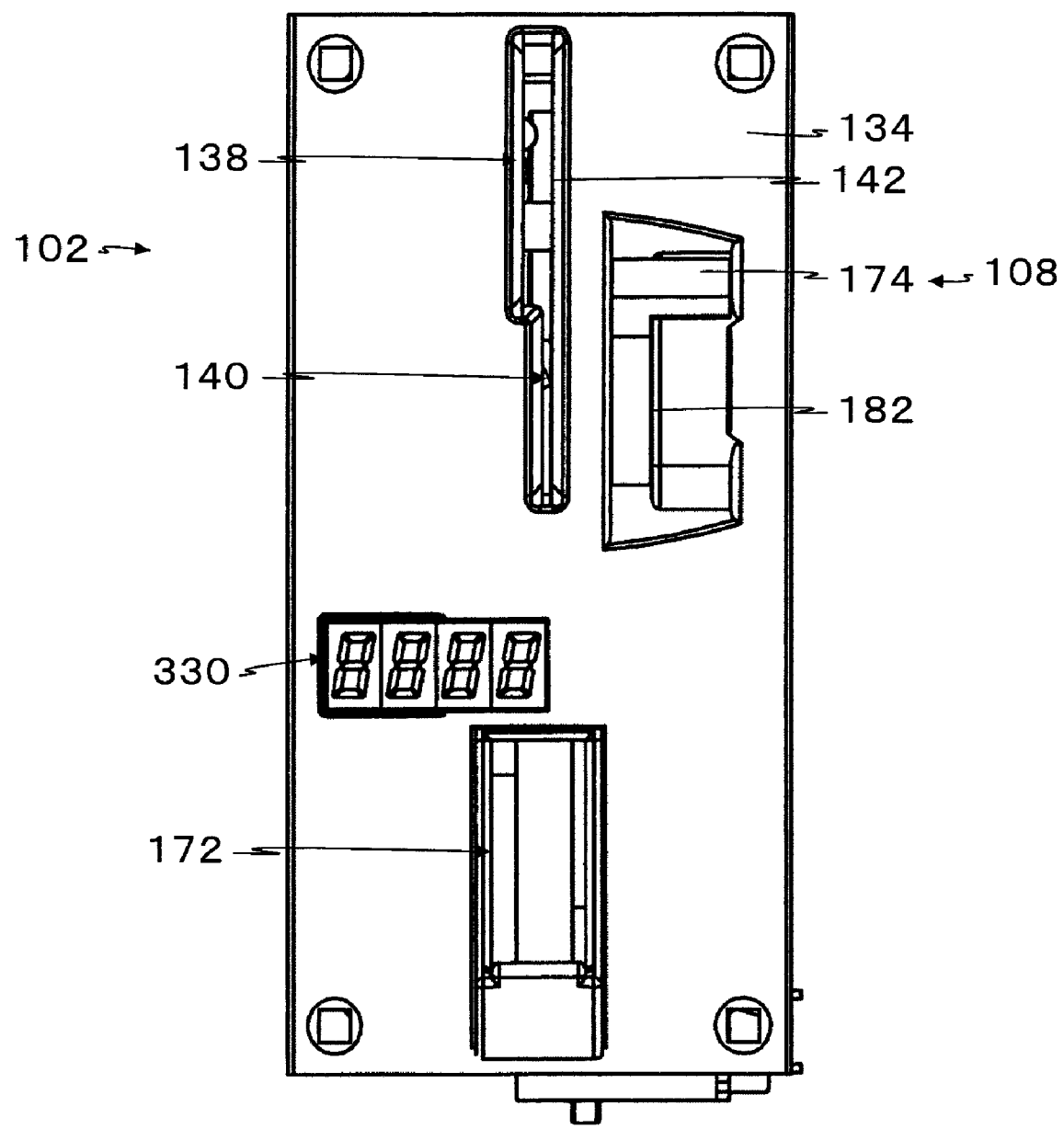
FIG. 2 is a front view of a value medium processing device according to an exemplary embodiment.
Figure 3:
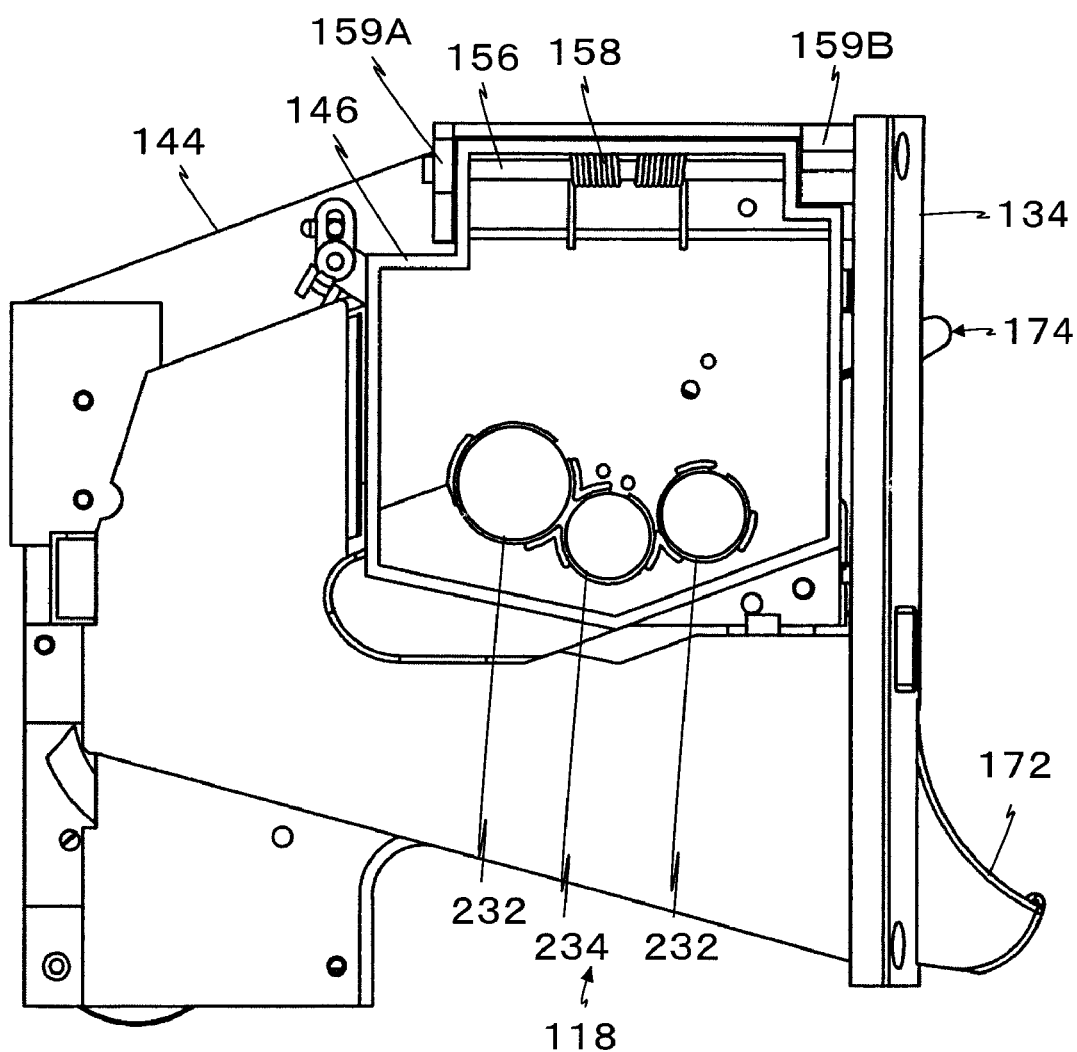
FIG. 3 is a left side view of a value medium processing device according to an exemplary embodiment.

Referring to the drawings in particular, in an exemplary embodiment, a coin C is in the form of a disc made of metal, and is able to roll on a slant path by its own weight. An IC coin IC is in the form of a disc which is able to roll on a slanted path by its own weight, and incorporates therein an IC chip TP having an antenna which allows non-contact reading or writing, and is thicker and diametrically larger than coin C. IC card CD is in the form of a rectangular thin plate, and incorporates therein IC chip TP which enables non-contact reading or writing, and has width (height) which is larger than diameter of IC coin IC. The term "electric value information recording medium" implies such a IC coin IC and IC of the card CD.

A value medium processing device 100 includes a slot 102, a coin path 104, an IC coin path 106, a canceling means 108, an IC card path 112, a detecting means 114 for electric value information recording medium, a cancel deactivating means 116, a discriminating means 118, a deflecting means 122, an IC coin retaining means 124, a value medium slotted-in blocking means 126, a communication means 128, a coin sorting means 130 and an IC coin sorting means 132.

The slot 102 has a function of accepting a coin C and an IC coin IC or an IC card CD serving as an electric value information recording medium slotted therethrough. The slot 102, however, may have a function of sorting coin C and accepting only one kind of electric value information recording medium as is the case of combination of coin C and IC coin IC or combination of coin C and IC card CD. The slot 102 is formed in an overlapping manner so that at least parts of a slot for coin C, a slot for IC coin IC and a slot for IC card CD are common with each other. By sharing parts, the space required for providing the slot can be reduced, which is advantageous in miniaturization of the apparatus. In the present exemplary embodiment, the slot 102 is formed in a front cover 134. The front cover 134 is secured so that it covers the front face of a front panel 136 which is a plate made of metal. In the present embodiment, the slot 102 is made up of a coin slot 138 shared by coin C and IC coin IC, having a vertically long rectangular shape and a card slot 140 for IC card CD. The coin slot 138 has a rectangular shape which is slightly larger in thickness and diameter than IC coin IC. An upper half of the card slot 140 is common with the coin slot 138, and extends in a slit shape below the lower end of the coin slot 138. The coin slot 138 and a lateral face 142 of the card slot 140 are formed on substantially the same upright line. This intends to share the communication means 128 between IC coin IC and IC chip TP of IC card CD as will be described later.

The coin path 104 has a function of guiding coin C slotted into the coin slot 138. The coin path 104 is structured by a base 144 and a cancel cover 146, and a rolling start guide rail 148 and a guide rail 150. The base 144 is a generally rectangular upright plate-like member made of non-magnetic material, which is secured perpendicularly to the front panel 136. A lateral face 152 of the base 144 is situated in the same plane with a lateral face 142 of the slot 102 for guiding slotted-in coin C and IC coin IC. Preferably, the base 144 is formed of resin as a single unit. The cancel cover 146 is a generally rectangular plate-like member made of non-magnetic material, and has an upper end part swingably supported by a shaft 156 attached to bearings 154A, 154B of the base 144, and hence receives a rotary force to approach the base 144 from a forcing spring 158. Preferably, the cancel cover 146 is formed of resin as a single unit. As for the cancel cover 146, an IC coin guide rail 162 projects from an IC coin guide lateral face 160 on the side of base 144, a coin guide rail 166 projects from a coin guide lateral face 164. An interval between the lateral face 152 of the base 144 and the coin guide lateral face 164 is set to be slightly larger than thickness of coin to be sorted. The rolling start guide rail 148 is a trapezoidal metal plate secured to the cancel cover 146 adjacently to the front panel 136, and has a curved drop rolling surface 168 which continues into the guide rail 150. This prevents the drop rolling surface 168 from being abraded by drop of coin C, and improves rolling speed of coin C. The coin path 104 is a path which extends straight and diagonally down to the right in FIG. 6, defined by the lateral face 152 of the base 144, coin guide lateral face 164 and the coin guide rail 166 of the cancel cover 146. Therefore, coin C is able to roll while being guided along the lateral face by the lateral face 160 and the coin guide lateral face 152 on the coin guide rail 166 in a standing position.

The IC coin path 106 has a function of allowing IC coin IC slotted into the coin slot 138 to roll by its own weight. The IC coin guide rail 162 is a linear projection formed diagonally extending down at a certain angle continuing from lower edge of the coin slot 138 (diagonally left down in FIG. 6). The IC coin path 106 is a path extending straight and diagonally left down in FIG. 6, defined by the lateral face 152 of the base 144, the lateral face 160 and the IC coin guide rail 162 of the cancel cover 146. The coin path 104 extends in parallel with the IC coin path 106 under the IC coin path 106, and communicates with the IC coin path 106 in a lower part adjacent to the coin slot 138. Since the width of the coin path 104 is smaller than thickness of the IC coin IC, the IC coin IC is unable to drop, and rolls on the IC coin guide rail 162. Immediately after being slotted through the coin slot 138, the coin C travels the IC coin path 106 by a distance of generally its diameter, and is then guided to the coin path 104 by the deflecting means 122. Therefore, the IC coin path 106 which leads to the coin slot 138 serves as a common path 170 which is common with the coin path 104 and is also common with the IC card path 112 as will be described later.

Figure 4:
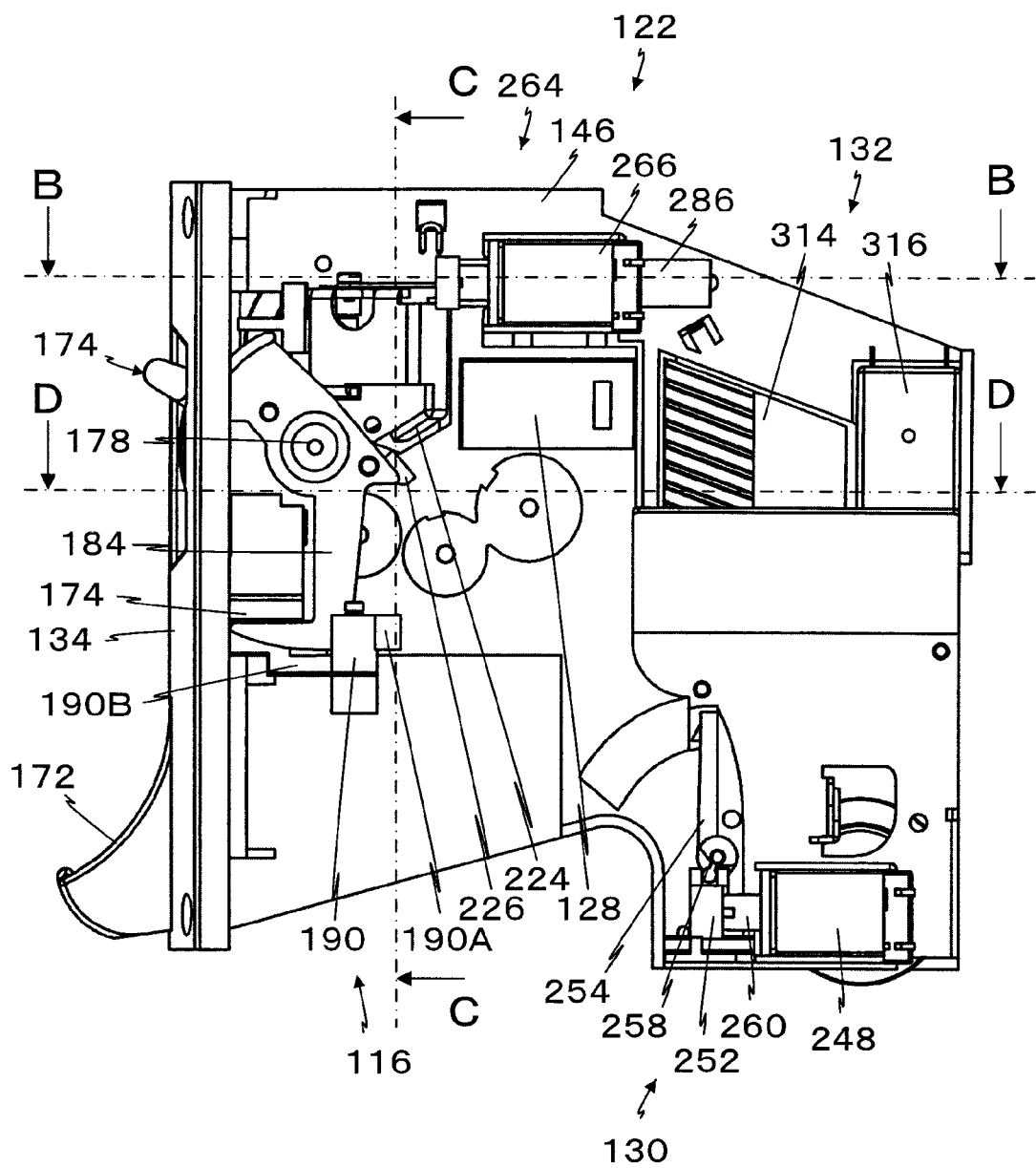
FIG. 4 is a right side view of a value medium processing device according to an exemplary embodiment.
Figure 5:
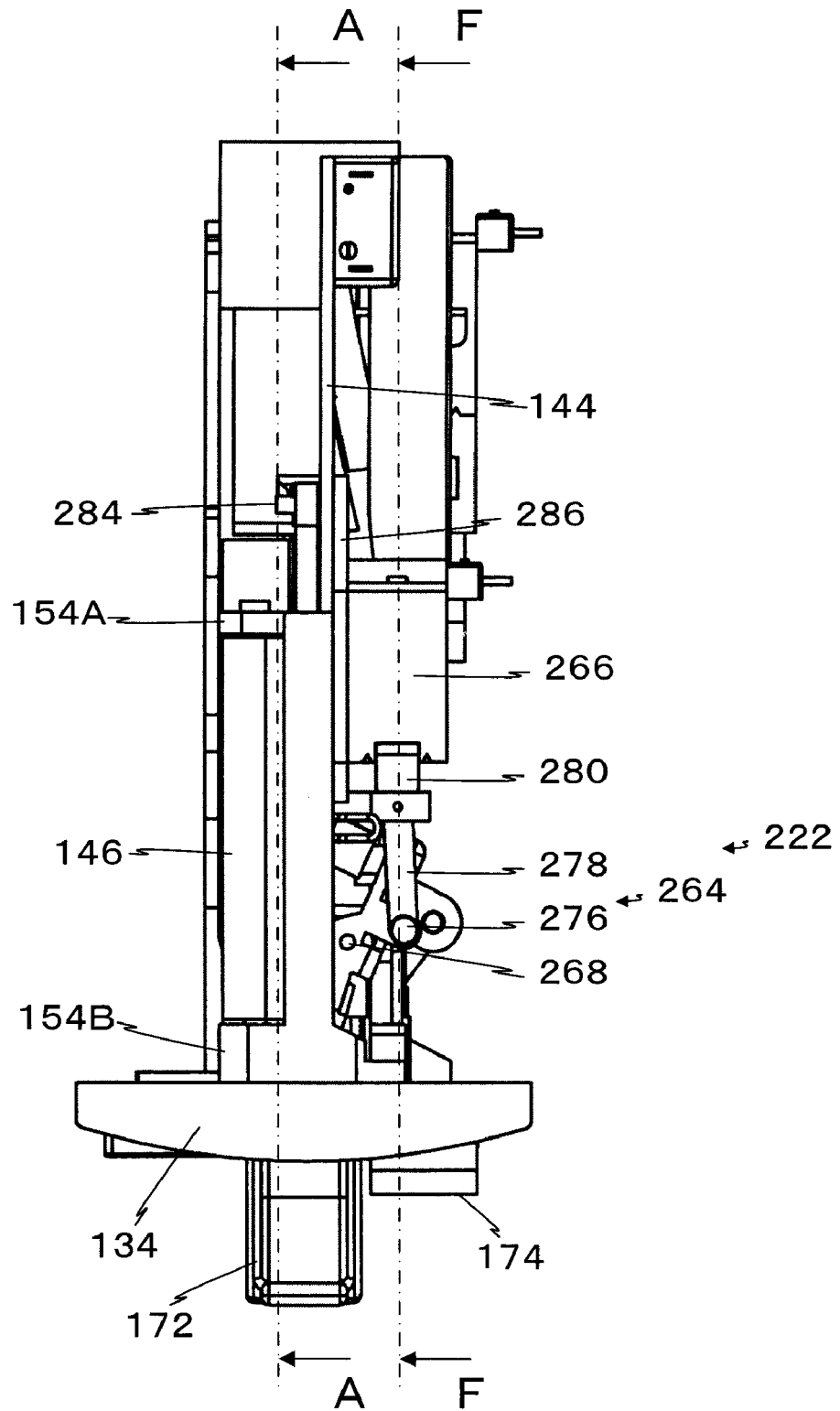
FIG. 5 is a plan view of a value medium processing device according to an exemplary embodiment.

The canceling means 108 has a function of canceling the IC coin IC or the coin C jamming in the IC coin path 106 or the coin path 104, or the slotted-in coin C or the IC coin IC, and returning it to a return slot 172. In the present exemplary embodiment, the canceling means 108 includes the cancel cover 146, a cancel lever 174, and a first link mechanism 176. The cancel lever 174 is a lever provided for a customer to operate for canceling the coin C or the IC coin IC, and has a middle part which is rotatably attached to a stationary shaft 178 laterally projecting from the base 144. An upper lever 180 thereof projects frontward of the front cover 134 through an opening 182 arranged next to the slot 102 in the front cover 134 so that a customer can push down. A lower lever 184 extends downward and parallel with respect to the front panel 136. Next, the first link mechanism 176 will be explained. The first link mechanism 176 has a function of shifting the cancel cover 146 in the direction of distancing from the base 144 when the lower lever 184 is rotated in counterclockwise direction in FIG. 4. The first link mechanism 176 includes a first swinging lever 190 of L-shape which is rotatably attached to a shaft 188 projecting upward from a stay 186 extending in the lateral direction from the base 144. A first lever 190A of the swinging lever 190 is pushed by the lower lever 184 to be driven to rotate in the clockwise direction in FIG. 5. A second lever 190B of the swinging lever 190 abuts with a lower end part of the cancel cover 146 through an opening of the base 144, and can be pushed to be driven. When the cancel lever 174 is rotated in the counterclockwise direction in FIG. 4, the lower lever 184 pushes the first lever 190A to be driver, and hence the second lever 190B pushes the lower end part of the cancel cover 146 to separate from the base 144. As a result, the cancel cover 146 rotates about the shaft 156, and is inclined with respect to the base 144, and interval between the lateral end face of the coin guide rail 166 and the lateral face 152 is set to be equal to or larger than thickness of coin C, and top face of the IC coin guide rail 166 is inclined downwardly with respect to the lateral direction, with the result that coin C laid thereon drops by its own weight. Immediately after Dropped coin C drops on a cancel guide rail 192 which is formed in the base 144 below the coin path 104 and inclined downward toward the front cover 134 side, rolls thereon rightward in FIG. 6 by its own weight, and rolls down into the return slot 172. Since the return slot 172 is formed into a groove which surrounds both sides and front face of coin C, coin C is held in a standing position in the return slot 172. Further, as the cancel cover 146 rotates, end face of the IC coin guide rail 162 is removed from the lateral face 152 by a distance of equal to or larger than thickness of IC coin IC, and a top face of the IC coin guide rail 162 is a slanted face which is inclined downward toward the lateral face 152. Therefore, after dropping from the IC coin guide rail 162, traversing the coin path 104, and then dropping onto the cancel guide rail 192 defining the cancel path 190, the IC coin IC rolls in a direction to the right in FIG. 6 by its own weight, and is then held in the return slot 172 in a standing position as is the case with coin C.

Next, the IC card path 112 of the IC card CD will be explained. The IC card path 112 extends along the lateral face 152 of the base 144 contiguously with the IC card slot 140, and is in the most part thereof in common with the IC coin path 106, and a part thereof is in common with the coin path 104. A lower end of the IC card path 112 is restricted by an advance/retreat piece 194 which is appropriately moved into/from the coin path 104. When the IC card CD is inserted into the card slot 140 and is detected, the advance/retreat piece 194 is advanced into the coin path 104 to support lower edge of IC card CD. The advance/retreat piece 194 is moved by a cancel deactivating means 116 as will be described later. The IC card IC is prevented from advancing by an upright wall 195 of the base 144 and held in retaining position HP. In this condition, about a quarter in the longitudinal direction of the IC card IC projects from the card slot 140.

The IC coin detecting means 114 is disposed in the common path 170, and has a function of determining whether the value medium slotted into the slot 136 is a coin or an IC coin IC or an IC card CD which is an electric value information recording medium. Therefore, it may be replaced by another device having equivalent function. In the present exemplary embodiment, the detecting means 114 includes a first sensor 196 and a second sensor 198 disposed on a lateral face 152 of the base 144. In the present exemplary embodiment, the first sensor 196 and the second sensor 198 are transmissive photoelectric sensors traversing the common path 170, however, they may be replaced by a reflective photoelectric sensor, a contact sensor or the like. The first sensor 196 is disposed near the deflecting means 122 and the IC coin guide rail 162, and projection light is blocked by the coin C and the IC coin IC. The second sensor 198 is positioned so that it will not be blocked by the coin C that passes along the common path 170, but blocked by the IC coin IC or the IC card CD having larger diameter than the coin C. Therefore, when the projected light of the first sensor 196 and the second sensor 198 is simultaneously blocked, it is determined that the IC coin IC or the IC card CD is slotted in, and the deflecting means 122 is caused to retreat from the common path 170.

Figure 10:
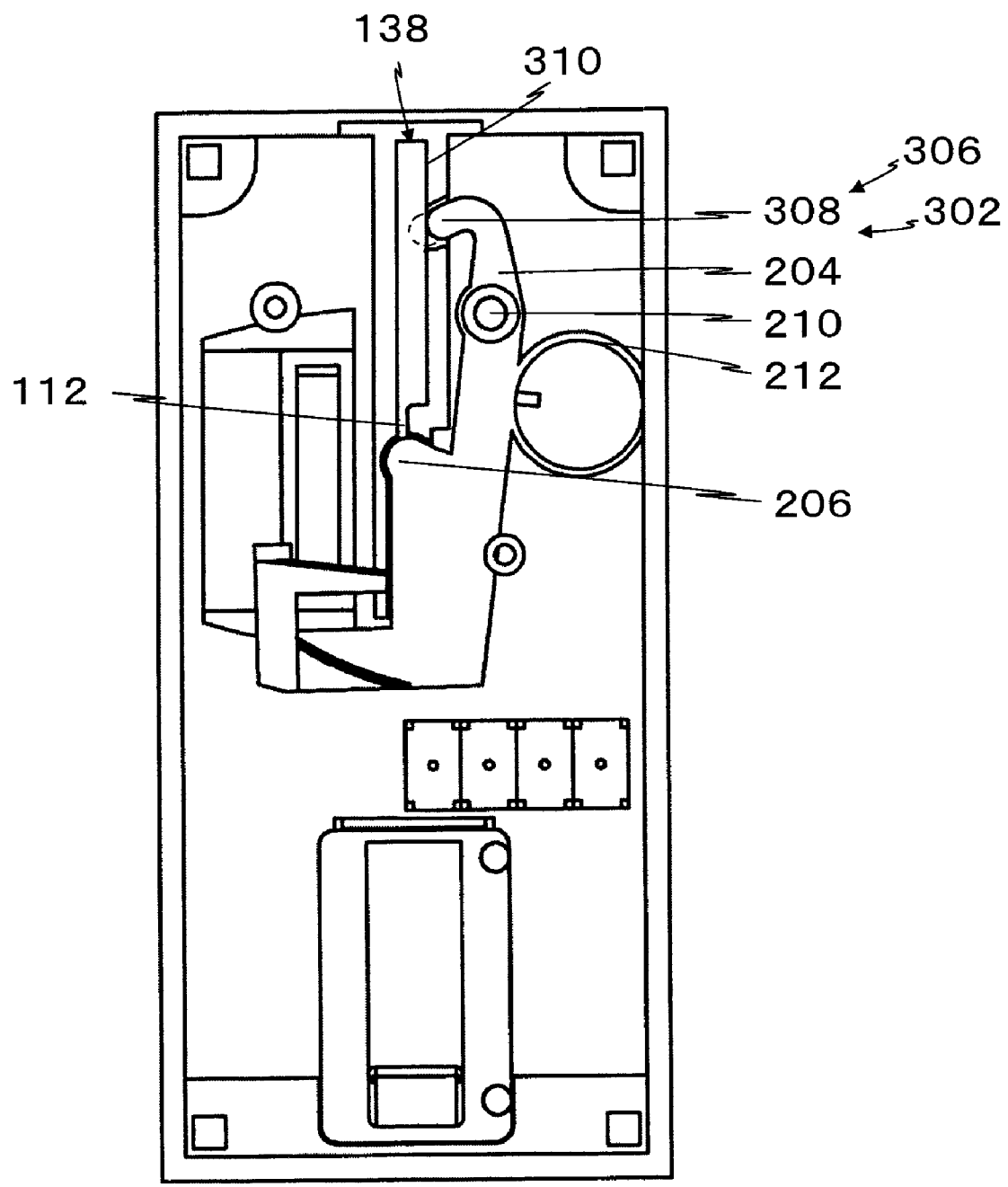
FIG. 10 is an explanatory of an IC coin blocking means.
Figure 11:
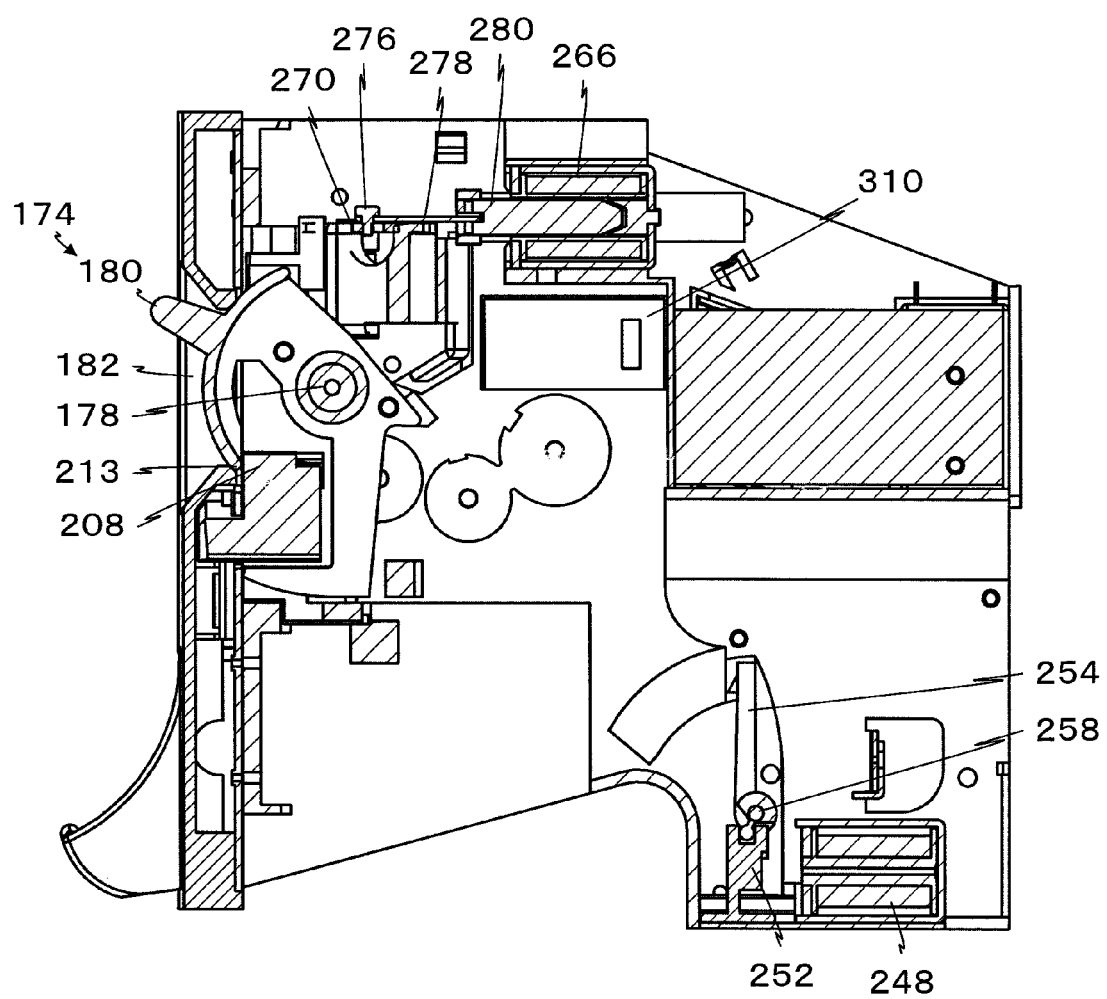
FIG. 11 is a sectional view taken along the line F-F in FIG. 5.

Next, the cancel deactivating means 116 will be explained. The cancel deactivating means 116 has a function of deactivating the canceling means 108 when the IC coin IC or the IC card CD is slotted into the slot 102. Therefore, the cancel deactivating means 116 may be replaced by another apparatus having equivalent function. In the present exemplary embodiment, the cancel deactivating means 116 mechanically deactivates the cancel lever 174. The structure with which the canceling means 108 is mechanically deactivated is advantageous in that it is constructed at low costs. First, an IC card deactivating means 202 for the IC card CD will be explained. As shown in FIG. 11, the IC card deactivating means 202 includes a driven lever 204, a driven part 206 and a stopper 208 (see FIG. 11). The driven lever 204, in its middle part, is rotatably attached to a stationary shaft 210 projecting backward from the front panel 136, and is biased by an elastic member 212 in the clockwise direction in FIG. 10. The driven part 206 is a hemispherical part formed in a middle part of a driven lever 214. The driven part 206 projects into the IC card path 112 when IC card IC is not inserted into the card slot 140, and is pushed to move while an end face of the card is in abutment with the spherical face of the driven part 206 when IC card IC is inserted, and is eventually pushed out of the IC card path 112. The stopper 208 is a rectangular block member formed at lower end of the driven lever 204, and when the driven part 206 is situated outside the IC card path 112, the stopper 208 projects in the rotating path of a lower end part 213 of the cancel lever 174 as shown in FIG. 11. As a result, when the cancel lever 174 is urged to be pushed down, the lower end part 212 is stopped by the stopper 208, so that the cancel lever 174 fails to be pushed down. Next, an IC coin deactivating means 222 will be explained. The IC coin deactivating means 222 has a function of deactivating the cancel lever 174 when the IC coin IC is slotted into the coin slot 138. Since a part of the IC coin deactivating means 222 is identical with the deflecting means 122 as will be described later, principle parts will be explained in explanation for the deflecting means 122. When the deflecting means 122 is in a non-deflective position, a second stopper 224 which integrally moves projects into a rotating path of a latch part 226 which is integrally formed with the cancel lever 174, whereby rotation of the cancel lever 174 is prevented.

The discriminating means 118 has a function of discriminating the genuine/false status and denomination of the coin C rolling along the coin path 104. The discriminating means 118 includes coin members 232, 234, 236 implemented by coils wound around the core fixed to the face with the base 144 and the cancel cover 146 along the coin path 104. The coil member 232 is used for detecting a diameter of the coin C. The coil member 234 is used for detecting a thickness of the coin C. The coil member 236 is used for detecting the material of the coin C. Outputs from these coil members 232, 234, 236 are input into discriminating circuits (not illustrated), and compared with predetermined reference values to discriminate the genuine/false status (authentic coin and false coin) and denomination of the coin C. In the case of a false coin, the discriminating means 118 outputs a cancel signal CS to a coin sorting means 242. The coin sorting means 242 has a function of sorting the coin C rolling along the coin path 104 into the canceling path 190 or a storing path 244 of a retaining cashbox. The coin sorting means 242 has a coin sorting member 246, an electromagnetic actuator 248 and a second link mechanism 252. The coin sorting member 246 can reside in a cancel position CP on the extended line of the coin path 104 or in a storage position SP leading to the storing path 244. The coin sorting member 246 is a bar extending laterally in the coin path 104 from an end of a second swinging lever 254 which is rotatably attached to a stationary shaft 258 projecting laterally from the base 144. The other end of the second swinging lever 254 is linked to an iron core 260 of the first electromagnetic actuator 248 by the link mechanism 252. The iron core 260 is biased in the left direction in FIG. 4 by a spring (not illustrated), and usually held in a cancel position CP. When the first electromagnetic actuator 248 is exited by the discriminating means 118, the iron core 260 is moved in the direction to the right in FIG. 4, so that the second swinging lever 254 is rotated in the counterclockwise direction, and moved and held in the storage position SP. When the coin sorting member 246 is held in the storage position SP, the coin C rolling along the coin path 104 drops onto the coin sorting member 246 from the coin guide rail 150 and guided to the storing path 244. When the coin sorting member 246 is in the cancel position CP, since the coin C dropped from the coin path 104 is guided in the direction to the right in FIG. 6 while abutting the coin sorting member 246, the coin C rolls along the canceling path 190 and is returned to the return slot 172.

Figure 6:
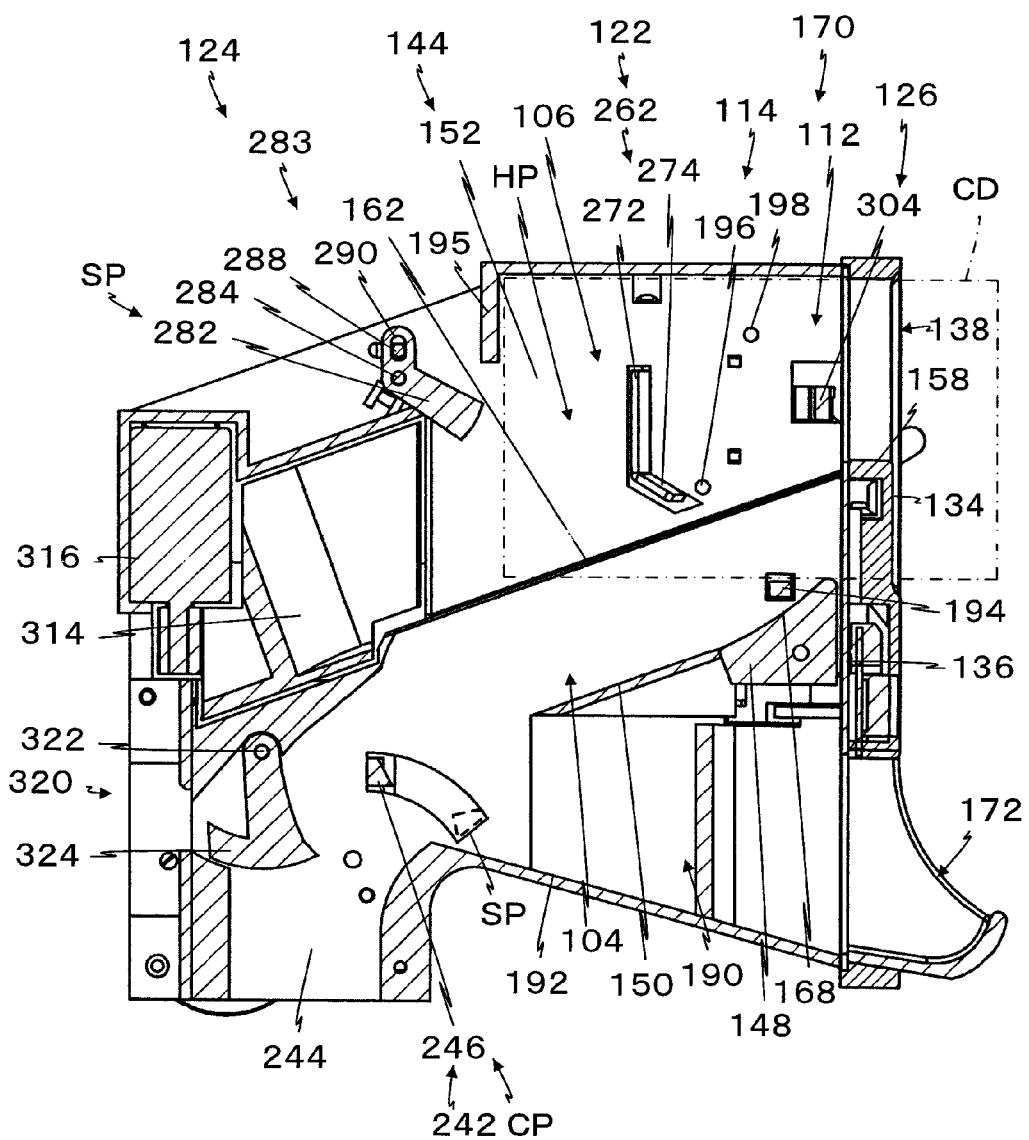
FIG. 6 is a sectional view taken along the line A-A in FIG. 5.
Figure 7:
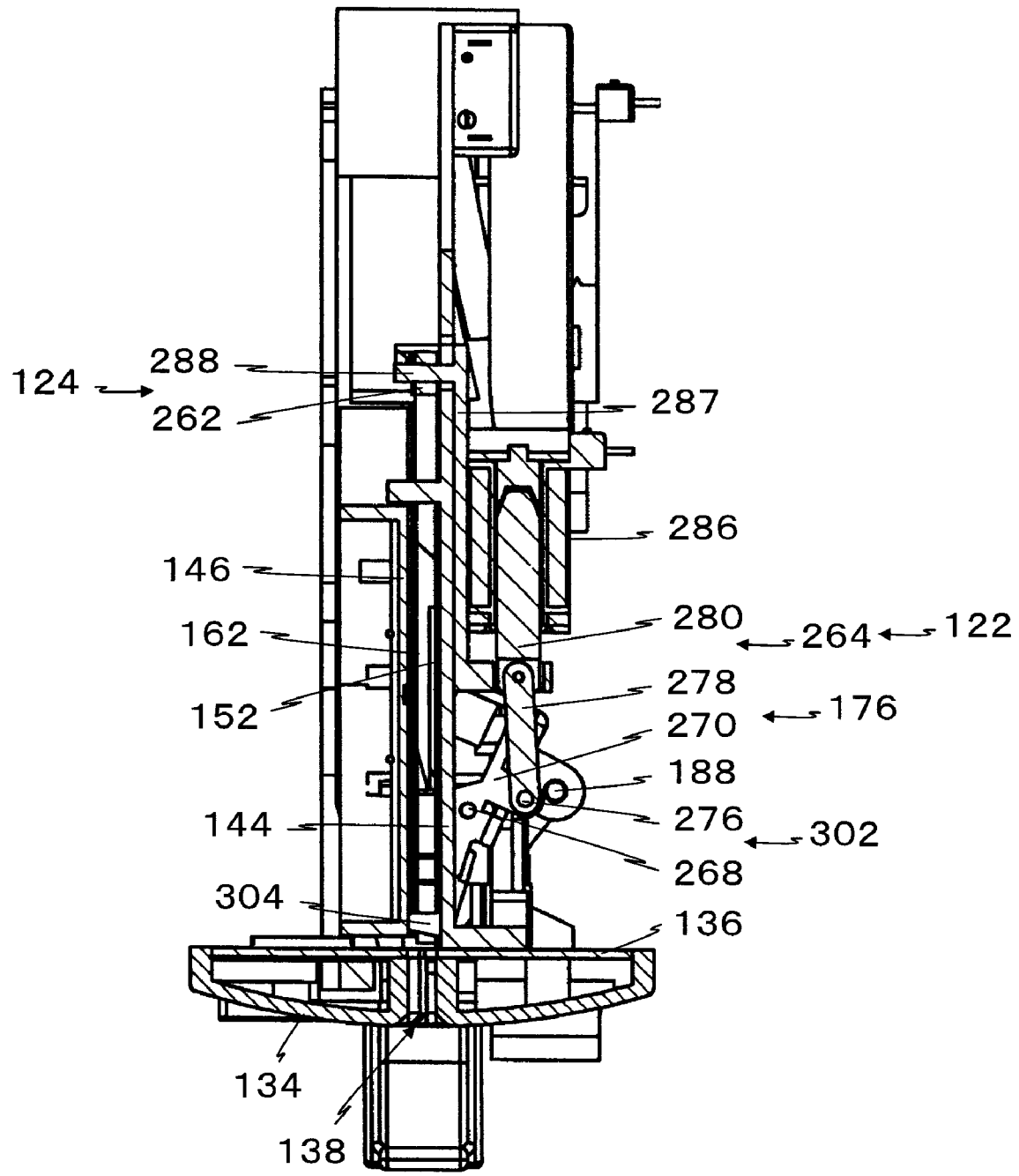
FIG. 7 is a sectional view taken along the line B-B in FIG. 4.
Figure 8:
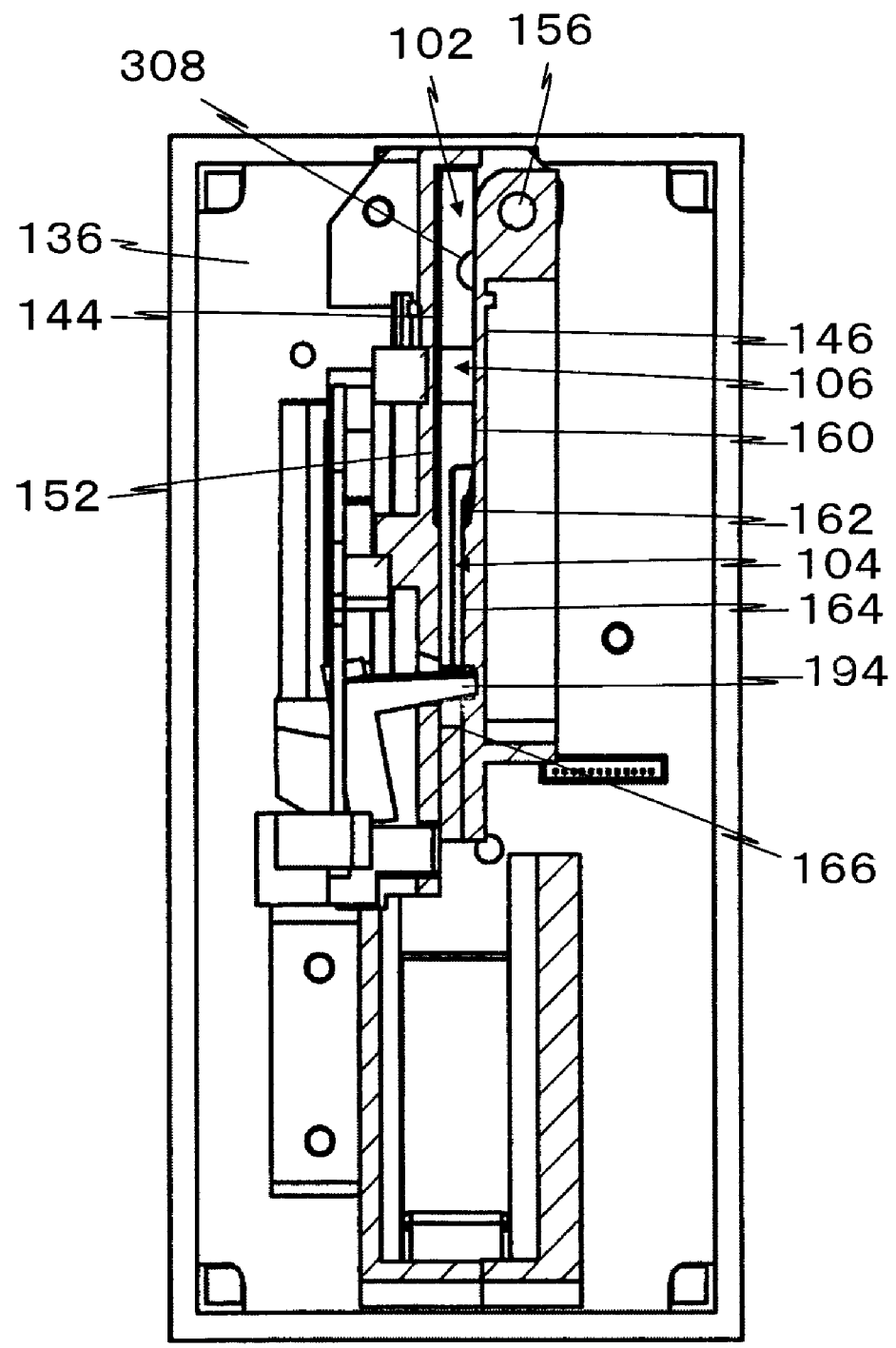
FIG. 8 is a sectional view taken along the line C-C in FIG. 4.

Next, the deflecting means 122 will be explained. The deflecting means 122 has a function of guiding the coin C slotted into the coin slot 138 to the coin path 106. The deflecting means 122 includes a deflecting member 262, a third link mechanism 264, and a second electromagnetic actuator 286. The deflecting member 262 is a plate-like member formed into a L-shape as shown in FIG. 6, and is positioned perpendicular to one end of the third swinging lever 270 which is rotatably attached to a stationary shaft 268 fixed in parallel with the base 144. The deflecting member 262 has an upright part 272 and a downwardly slant part 274 wherein a slotted-in coin C is guided toward the front panel 136 by the slant part 274 after the coin C collides with the upright part 272 and drops downward, and then drops onto the rolling face 168 of the rolling start guide rail 148 adjacent to the front panel 136. An end part of a link 278 is rotatably attached to a shaft 276 which projects upward from the position which is farther to the base 144 than the stationary shaft 268 of the third swinging lever 270. The other end of the link 278 is rotatably attached to an iron core 280 of the second electromagnetic actuator 286. The iron core 280 is biased into a projecting direction by a spring (not illustrated). Therefore, when the second electromagnetic actuator 286 is excited and the iron core 280 is suctioned and moved upward in FIG. 5, the third swinging lever 270 is rotated in the clockwise direction, and the deflecting member 262 is moved outside the common path 170 (condition of FIG. 5). When the second electromagnetic actuator 286 is demagnetized, the iron core 280 is moved leftward in FIG. 4 by a spring (not illustrated). The third swinging lever 270 is rotated in counterclockwise direction, and the deflecting member 262 advances into the common path 170, and lies to generally traverse the common path 170. Therefore, when the coin C is slotted in, the coin C is prevented from advancing in the common path 170 by the deflecting member 262 and is guided to the coin path 104 by dropping downward.

The IC coin retaining means 124 has a function of retaining the IC coin IC in the IC coin path 106 when the IC coin IC is slotted in. The coin retaining means 124 includes a stop piece 282 and a fourth link mechanism 283 with the second electromagnetic actuator 286. The stop piece 282 is rotatably attached to a stationary shaft 284 which laterally projects from the base 144 above the IC coin path 106, and hence is rotatable in a plane which is adjacent to the base 144 and parallel with the base 144. The fourth link mechanism 283 is secured to the iron core 280, and includes a sliding piece 287 which is reciprocatingly movable in the lateral direction while guided by the base 144, a pin 288 projecting laterally from the sliding piece 287, and a long hole 290 formed in the stop piece 282, and the pin 288 is slidably inserted into the long hole 290. When the second electromagnetic actuator 286 is demagnetized, since the sliding piece 287 is positioned at the rightmost position in FIG. 4, the stop piece 282 is rotated in the clockwise direction in FIG. 6 and held in a retaining position SP. When the stop piece 282 is positioned at the retaining position SP, the IC coin IC having rolled on the IC coin guide rail 162 comes into abutment with an end of the stop piece 282 to be prevented from rolling, and held in a retaining position HP. The retaining positions HP of the IC coin IC and the IC card IC overlap with each other. When the second electromagnetic actuator 286 is excited, since the iron core 280 is moved to the right in FIG. 4, the stop piece 282 is rotated in the counterclockwise direction in FIG. 6. As a result, an end of the stop piece 282 is moved so that it does not come into abutment with the IC coin IC, which enables the IC coin IC to further roll along the IC coin path 106.

Next, the value medium slotted-in blocking means 126 will be explained. The value medium slot blocking means 126 has a function of disabling the coin C to be slotted into the coin slot 138 when the IC coin IC or the IC card CD is retained in retaining position BP. An IC coin blocking means 302 associated with the IC coin IC is a lateral first blocking piece 304 which is formed in an end of the lever elastically supported by the third swinging lever 270. The first blocking piece 304 is able to advance into or retreat from the common path 170 in a position behind the coin slot 138 and adjacent to the front panel 136. Therefore, the deflecting member 262 and the first blocking piece 304 advance to or/retreat from the common path 170 in reverse phases by swinging of the third swinging lever 270. To be more specific, when the deflecting member 262 is positioned in the common path 170, the first blocking piece 304 is retracted from the common path 170. When the deflecting member 262 is retracted from the common path 170, the first blocking piece 304 is positioned opposite to the coin slot 138 in the common path 170. Therefore, when the first blocking piece 304 is positioned in the common path 170, it is impossible to slot the coin C into the coin slot 138. When the IC card CD is positioned in the IC card path 112, the first blocking piece 304 is prevented from advancing into the common path 170 because it is blocked by the IC card CD, however, since it is formed in an end of the lever which is elastically supported by the third swinging lever 270 and is able to escape, there arises no problem. An IC card blocking means 306 relating to the IC card CD is a hook-like second blocking piece 308 which is formed in an upper end of the driven lever 204. When the driven part 206 is positioned in the IC card path 112, the second blocking piece 308 is moved to the retracted position from the common path 170 opposing to the coin slot 138, whereas when the driven part 206 is positioned in the IC card path 112, it is advanced into the common path 170 through an opening of a lateral wall 310 on the opposite side of the IC card path 112. Therefore, when the second blocking piece 308 is positioned in the common path 170, the coin C is prevented from being slotted into the coin slot 138 by the second blocking piece 308.

The communication means 128 has a function of communicating value information with the IC coin IC or the IC chip TP of the IC card CD retained in retaining position HP. In the present exemplary embodiment, the communication means 128 is a communication substrate 310 secured to the base 144, and carrying an IC having communication function and an antenna.

Figure 9:
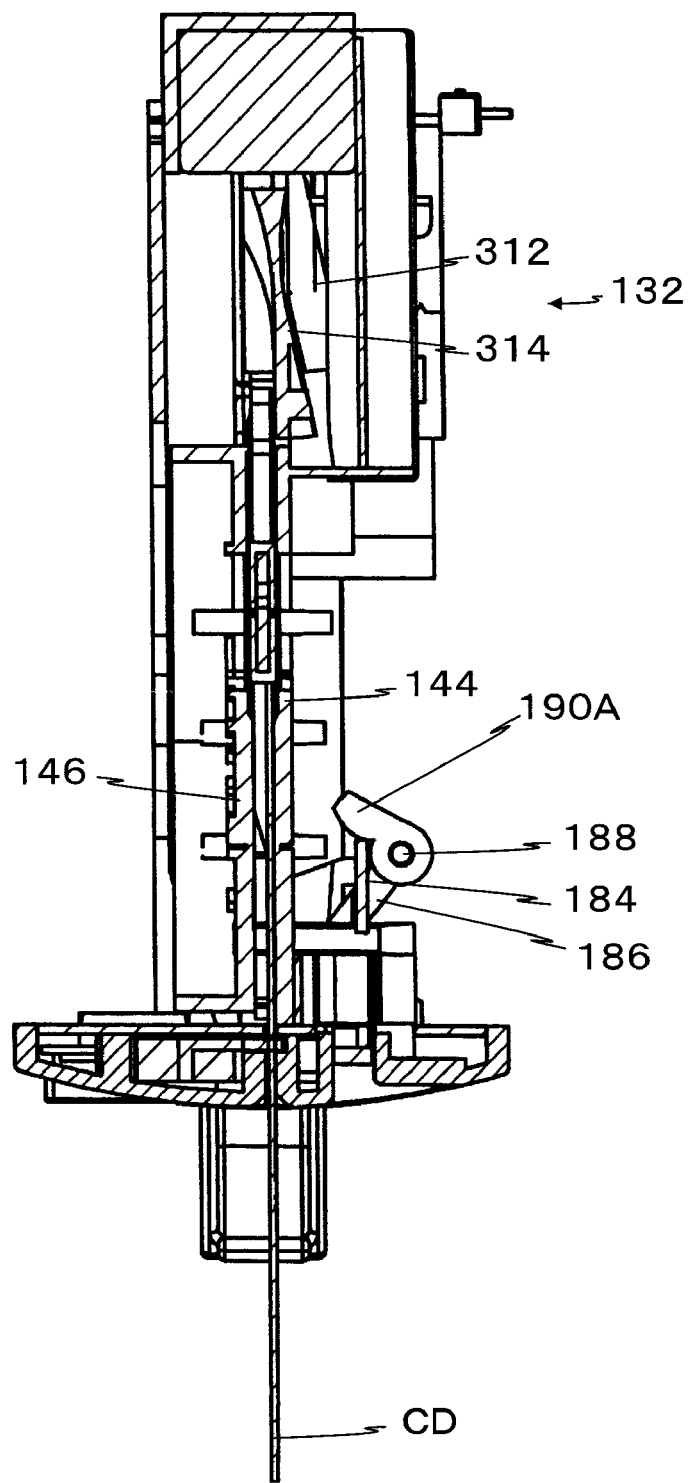
FIG. 9 is a sectional view taken along the line D-D in FIG. 4.

The IC coin sorting means 132 has a function of sorting the IC coin IC which is released from retention by the stop piece 282 into an IC coin storing path 312 or the canceling path 190. The IC coin sorting means 132 includes an IC coin sorting member 314 and a third electromagnetic actuator 316. The IC coin sorting member 314 has a plate-like shape, and is secured to an output axis of the third electromagnetic actuator 316. When the third electromagnetic actuator 316 is not exited, the IC coin sorting member 314 is held in a position where it guides the IC coin IC into the canceling path 190 (see FIG. 9). When the third electromagnetic actuator 316 is exited, it is rotated in the clockwise direction in FIG. 9, so that the IC coin IC is guided into the IC coin storing path 312.

Preferably, a thread-hanging preventing means 320 is provided in the storing path 244. In the present exemplary embodiment, the hanging blocking means 320 is a fan-like blocking member 324 which is swingably attached to a shaft 322. Usually, it is suspended while a part of the blocking member 324 projects into the storing path 244 by gravity. When an authentic coin C passes, the blocking member 324 is moved by the coin C so that the coin C is able to pass. After passage of the coin C, the blocking member 324 returns to the original position. Thereof, if a coin C is hung with thread and an attempt is made to draw it up, it cannot be drawn up because it is blocked by the blocking member 324. Preferably, the front cover 134 is provided with a display 330 for displaying value information recorded in the IC coin IC or the IC chip TP of the IC card CD.

Next, operation of the present exemplary embodiment will be explained. First, explanation will be made for the case where an authentic the coin C is slotted in. When the present value medium processing device 100 is not in a standby state, the second electromagnetic actuator 286 of the deflecting means 122 is demagnetized, and in FIG. 5, the iron core 280 is moved downward by a spring (not illustrated), and the third swinging lever 270 is rotated in the clockwise direction via the link 278 and positioned in the most clockwise position. As a result, the deflecting member 262 is held in a position retracted from the common path 170. On the other hand, the slotted-in blocking piece 304 which is moved in reverse phase is advanced into the common path 170. Therefore, slotting of the coin C, the IC coin IC and the IC card CD into the slot 102 is disabled. When the present value medium processing device 100 is in a standby state, the second electromagnetic actuator 286 is exited, and the iron core 280 is drawn up in FIG. 5, and the third swinging lever 270 is rotated in the counterclockwise direction via the link 278. As a result, the deflecting member 262 advances into the common path 170, while the slotted-in blocking piece 304 retracts from the common path 170. As a result, slotting of value recording medium into the coin slot 138 and the IC card slot 140 is enabled. The first electromagnetic actuator 248 of the coin sorting means 130 is demagnetized, and the iron core 260 is moved rightward in FIG. 4 by a spring (not illustrated), so that the second swinging lever 254 is moved to the most clockwise position in FIG. 4 via the link 252. As a result, the sorting member 246 is held in the cancel position CP (practical position in FIG. 6). Also the third electromagnetic actuator 316 of the IC coin sorting means 132 is demagnetized, and held in the cancel position.

A slotted-in coin C drops down by gravity while moving leftward in FIG. 6, and moves diagonally left downward in FIG. 6 in the common path 170 while generally directing diagonally downward, and collides with the upright part 272 of the deflecting member 262. Since the coin C has a small diameter, it will not concurrently block optical axes of the first sensor 196 and the second sensor 198, and the second electromagnetic actuator 266 is kept demagnetized. The colliding coin C drops while it is repelled on opposite end side, and it is repelled on the side of the front panel 136 by the slant part 274, and drops onto the rolling start guide rail 148. The coin C having dropped onto the rolling face 168 rolls while it is accelerated by the circular arc face, and then rolls along the guide rail 150. The coin C sequentially faces with the sensor members 236, 234, 232 while it rolls on the guide rail 150, whereby identification information about material, thickness and diameter of the coin C is collected. The discriminating means 118 discriminates the genuine/false status of the coin C from such identification information. In the present case addressed to an authentic coin, it is discriminated as an authentic coin, and the first electromagnetic actuator 248 is excited for a predetermined time. This excitation causes the iron core 260 to be drawn rightward in FIG. 4, so that the second swinging lever 254 is rotated in the counterclockwise direction. As a result, the sorting member 246 is moved into the retaining position SP. The coin C having dropped from the guide rail 150 drops onto the sorting member 246, so that it is repelled leftward in FIG. 6 and is guided into the storing path 244. The coin C dropping along the storing path 244 passes while rotating the blocking member 324 in the clockwise direction in FIG. 6, and is then retained in a retention cashbox (not illustrated). Even if one tries to draw up the retained the coin C by handing it with a thread, the coin C is blocked by the blocking piece 324 and will not be drawn up.

Next, explanation will be made for the case where a false coin is slotted in. A false coin slotted into the coin slot 138 rolls on the guide rail 150 of the coin path 104 in a similar manner as described above. Since the discriminating means 118 outputs a false signal based on identification information from the sensor members 236, 234, 232, the first electromagnetic actuator 248 is not exited. As a result, the sorting member 246 is maintained in the cancel position CP, and the false coin comes into collision with the sorting member 242 and is guided to the canceling path 190 and cancelled.

Next, explanation will be made for the case where the IC coin IC is slotted into the coin slot 138. The IC coin IC rolls on the IC coin guide rail 162 and moves along the IC coin path 106 from the right to the left in FIG. 6. Since the IC coin IC shields the projecting light of the first sensor 196 and the second sensor 198 during rolling, the detecting means 118 detects the IC coin IC as an electric value information recording medium. As a result, the second electromagnetic actuator 266 is demagnetized, and the iron core 280 is moved downward in FIG. 5, so that the third swinging lever 270 is rotated in the clockwise direction, and the deflecting member 262 retracts from the common path 170 and the IC coin slotted-in blocking piece 304 advances to the common path 170. This disables the coin C and the IC card CD to be slotted in. Further, a latch piece 282 is rotated into the position shown in FIG. 6 via the sliding piece 286 and the pin 288, and is held in the retaining position SP. Further, since the second stopper 224 projects into rotation path of the latch part 226, the cancel lever 174 fails to rotate. As the deflecting member 262 is retracted from the common path 170, the IC coin IC rotates on the IC coin guide rail 162 and an upper end part thereof is stopped by the latch piece 282 and is retained in the retaining position HP. After being retained in the IC coin IC retaining position HP, the communication means 128 communicates with the IC chip TP incorporated in the IC coin IC, for reading or writing value information. When it is retained in the IC coin IC retaining position HP, the cancel lever 174 cannot be rotated as described above, it is impossible to cancel the IC coin IC. This prevents irregular rewriting of information in the IC chip TP, and an abnormal condition in the reading or writing process due to movement of the IC coin IC during reading or writing process of the IC chip TP. When value information of the IC coin IC is zero, the third electromagnetic actuator 316 of the IC coin sorting means 132 is exited, and is held in the storage position. Then the second electromagnetic actuator 266 is exited and moved to the rightmost position in FIG. 4. As a result, the sliding piece 286 is moved in the same direction, and the latch piece 282 is rotated in the counterclockwise direction in FIG. 6 via the pin 288, and moved to a no-retaining position. The IC coin IC rolls by inclination of the IC coin guide rail 162 and reaches the sorting member 314. Since the sorting member 314 is in the retaining position, the IC coin IC is guided to the IC coin retaining path 312. When there remains value information in the IC coin IC, the third electromagnetic actuator 316 is not exited and is held in the cancel position. In this case, the IC coin IC is guided to the canceling path 190 by the sorting member 314, and is returned to the return slot 172.

Next, explanation will be made for the case where the IC card CD is slotted in. When the IC card CD is slotted into the IC card slot 140, the IC card CD pushes and moves the driven part 206 in the IC card path 112 and pushes it out of the IC card path 112. As a result, the driven lever 204 is rotated in the counterclockwise direction in FIG. 10, so that the second blocking piece 308 projects to traverse the common path 170. As a result, the coin C cannot be slotted into the coin slot 138. Further, since the stopper 208 which is integrally formed with the driven lever 204 projects into the moving path of the lower end part 213 of the cancel lever 174, the cancel lever 174 cannot be rotated. In other words, when the IC card CD is slotted into the slot 102, the coin C cannot be slotted into the coin slot 138. Further, since the first sensor 196 and the second sensor 198 detect the IC card CD simultaneously, the second electromagnetic actuator 266 is exited, and the deflecting means 262 is retracted from the common path 170. Therefore, the IC card CD may be inserted until its end is prevented by the upright wall 195 while its lower end is guided by the advance/retreat piece 194. On the other hand, the first blocking piece 304 is about to advance into the common path 170, however, it fails to advance because it is blocked by the IC card CD. However, since the first blocking piece 304 is elastically attached to the third swinging lever 270, no problem arises. As to the IC chip TP of the IC card CD, value information is read or written by the communication means 128 in the retaining position HP in a similar manner as described for the IC coin IC. When the IC card CD is positioned in the IC card path 112, the cancel lever 174 cannot be pushed down as is the case with the above. Therefore, the IC card CD will not be moved during reading or writing to cause abnormal reading or writing.

While a specific embodiment of the invention has been shown and described in detail to illustrate the application of the principles of the invention, it will be understood that the invention may be embodied otherwise without departing from such principles.

What is claimed is:

1. A value medium processing device comprising:
  a means for defining a coin and an IC coin common slot;
  a downward common path continuing from said common slot;
  a coin path, whereby a coin slotted into the coin slot is rolled along the coin path for discriminating a genuine/false status thereof;
  an IC coin path wherein a coin and an IC coin are guided to one of said coin path and said IC coin path after the coin and the IC coin are slotted into said common slot;
  a canceling means for canceling a coin in the coin path;
  an IC coin detecting means provided with said IC coin path;
  an IC coin guide rail comprising a linear projection, said linear projection extending diagonally downwards at a predetermined angle from a lower edge of said common slot, said IC coin path being formed above and on said integrated coin guide rail;
  an IC coin retaining means for retaining the IC coin on said IC coin guide rail;
  a guide rail located under and parallel to said integrated coin guide rail, said coin path being formed above and on said guide rail and said coin path extending in parallel with said IC coin path under said IC coin path, said coin path being narrower than said IC coin path, wherein an upper part of said coin path is in communication with said IC coin path;
  a deactivating means for deactivating the canceling means based on a detection by the IC coin detecting means, said canceling means comprising a cancel lever for canceling a coin or an IC coin and a cancel cover, said IC guide rail linearly projecting from said cancel cover, said cancel cover being pivoted away from a side of an upright base when said cancel lever is operated.

2. A value medium processing device comprising:
a means for defining a coin and an IC coin common slot;
a downward common path continuing from the common slot;
a coin path, wherein a coin slotted into said common slot is rolled along said coin path for discriminating a genuine coin status or a false coin status thereof;
an IC coin path wherein following a coin and an IC coin being slotted into the common slot the coin and the IC coin are guided to said coin path or said IC coin path, said IC coin path having an IC coin path width, said coin path having a coin path width, said coin path width being less than said IC coin path width;
a canceling means for canceling the coin, said canceling means comprising a cancel cover and a cancel lever for canceling the coin or the IC coin;
IC coin detecting means provided with the IC coin path;
an upright base;
an IC coin guide rail comprising a linear projection, said linear projection extending in a diagonally downward direction at a predetermined angle from a lower edge of said common slot, said IC coin guide rail defining at least a portion of said IC coin path, said IC coin guide rail projecting linearly from said cancel cover, said cancel cover being pivoted in a direction away from a side of said upright base when said cancel lever is operated;
a deactivating means for deactivating the canceling means based on detection by the IC coin detecting means, the coin path being disposed under the downward common path continuing from the slot;
a deflecting means disposed in the common path;
a coin discriminating means disposed to face the coin path;
an IC coin retaining means for retaining the IC coin on said IC coin guide rail, said IC coin retaining means being disposed downstream of the deflecting means in the IC coin path wherein when the IC coin retaining means is in a retaining position for retaining the IC coin, operation of the canceling means is deactivated and when the IC coin detecting means discriminates a coin, the slotted-in coin is guided to the coin path by the deflecting means;
a guide rail located at a position below said IC coin guide rail, said guide rail being parallel to said IC coin guide rail, said guide rail defining at least a portion of said coin path, said coin path extending in parallel with said IC coin path at a position below said IC coin path, said coin path having an upper coin path section, said upper coin path section being in communication with said IC coin path.

3. A value medium processing device according to claim 2, wherein:
the IC coin path is a path that continues from the slot and is inclined downward at a predetermined angle;
the coin path is a path that continues from the slot and is inclined at a predetermined angle below the IC coin path; and
the downward common path continues from the slot and generally corresponds to coin diameter for a coin and an IC coin.

4. A value medium processing device according to claim 3, wherein the coin path and the IC coin path are defined by said upright base, said cancel cover which can be approached to or removed from the base, said guide rail and said IC coin guide rail inclined downward at predetermined angles, said IC coin guide rail and said guide rail formed integrally with the cancel cover.

5. A value medium processing device according to claim 2, further comprising:
a value medium slotted-in blocking means for blocking the slot, the value medium slotted-in blocking means being in a position where the value medium slotted-in blocking means substantially closes the slot when the deflecting means is being guided in the IC coin path, while said value medium slotted-in blocking means is in a slotted-in allowing position when the deflecting means is not being guided.

6. A value medium processing device according to claim 3, further comprising:
a value medium slotted-in blocking means for blocking the slot, the value medium slotted-in blocking means being in a position where the value medium slotted-in blocking means substantially closes the slot when the deflecting means is being guided in the IC coin path, while said value medium slotted-in blocking means is in a slotted-in allowing position when the deflecting means is not being guided.

7. A value medium processing device according to claim 2, wherein the slot is rectangular and a vertically long IC card slot is formed along a lateral wall of the IC coin path.

8. A value medium processing device comprising:
a coin path;
a common slot with a coin slot portion for coins and electric value medium slot portions for an electric value media wherein the coin slot portion and the electric value recording medium slot portions are at least partly in common with each other, whereby a coin slotted into the coin slot portion is rolled along the coin path for discriminating the genuine/false status thereof;
a downward common path continuing from the common slot, said coin path operatively continuing from the common path;
an IC coin path operatively continuing from the common path, one of said electric value medium slot portions being an IC coin slot wherein following a coin and an IC coin being slotted into the common slot the coin and the IC coin are guided to one of the coin path and the IC coin path, the IC coin path being wider than said coin path;
an IC coin guide rail comprising a linear projection extending in a diagonally downwards direction at a predetermined angle from a lower edge of said common slot, said IC coin path being defined by at least a portion of said IC coin guide rail;
a canceling means for canceling a coin in the coin path;
an IC coin detecting means provided with the IC coin path;
an IC coin retaining means for retaining the IC coin on said IC coin guide rail;
an upright base;
a guide rail located at a position below said IC coin guide rail, said coin path being defined by at least a portion of said guide rail, said guide rail being parallel to said IC coin guide rail, said coin path extending in parallel with said IC coin path at a position below said IC coin path, said coin path having an upper coin path portion, said upper coin path portion being in communication with said IC coin path, said canceling means comprising a cancel cover and a cancel for canceling the coin or IC coin, said IC coin guide rail projecting linearly from said cancel cover, said cancel cover being pivotably connected to said upright base such that said cancel cover pivots in a direction away from a side of said upright base when said cancel lever is operated;

a value medium detecting means for electric value medium, said value medium detecting means being provided in the electric value medium slot portion; and a deactivating means for deactivating the canceling means based on a detection by the detecting means, said deactivating means deactivating the canceling means based on detection by the IC coin detecting means or the value medium detecting means.

9. A value medium processing device according to claim 8, further comprising:

a deflecting means disposed in the common path, the coin path being disposed under the downward common path continuing from the slot;

a coin discriminating means disposed to face the coin path, said IC coin retaining means being disposed downstream of the deflecting means in the IC coin path wherein when the IC coin retaining means is in a retaining position for retaining the IC coin, operation of the canceling means is deactivated and when the IC coin detecting means discriminates a coin, the slotted-in coin is guided to the coin path by the deflecting means.

10. A value medium processing device according to claim 9, wherein:

the IC coin path is inclined downward at a predetermined angle;

the coin path is inclined at a predetermined angle below the IC coin path; and the downward common path generally corresponds to a coin diameter for a coin and an IC coin.

11. A value medium processing device according to claim 10, wherein the coin path and the IC coin path are defined by said upright base, said cancel cover which can be approached to or removed from the base, said guide rail and said IC coin guide rail inclined downward at predetermined angles, said guide rail and said IC coin guide rail being formed integrally with the cancel cover.

12. A value medium processing device according to claim 9, further comprising:

a value medium slotted-in blocking means for blocking the slot, the value medium slotted-in blocking means being in a position where the value medium slotted-in blocking means substantially closes the slot when the deflecting means is being guided in the IC coin path, while said slotted-in blocking means is in a slotted-in allowing position when the deflecting means is not being guided.

13. A value medium processing device according to claim 8, wherein the slot is rectangular and a vertically long IC card slot is formed along a lateral wall of the IC coin path.

* * * * *